UNITED STATES PATENT OFFICE.

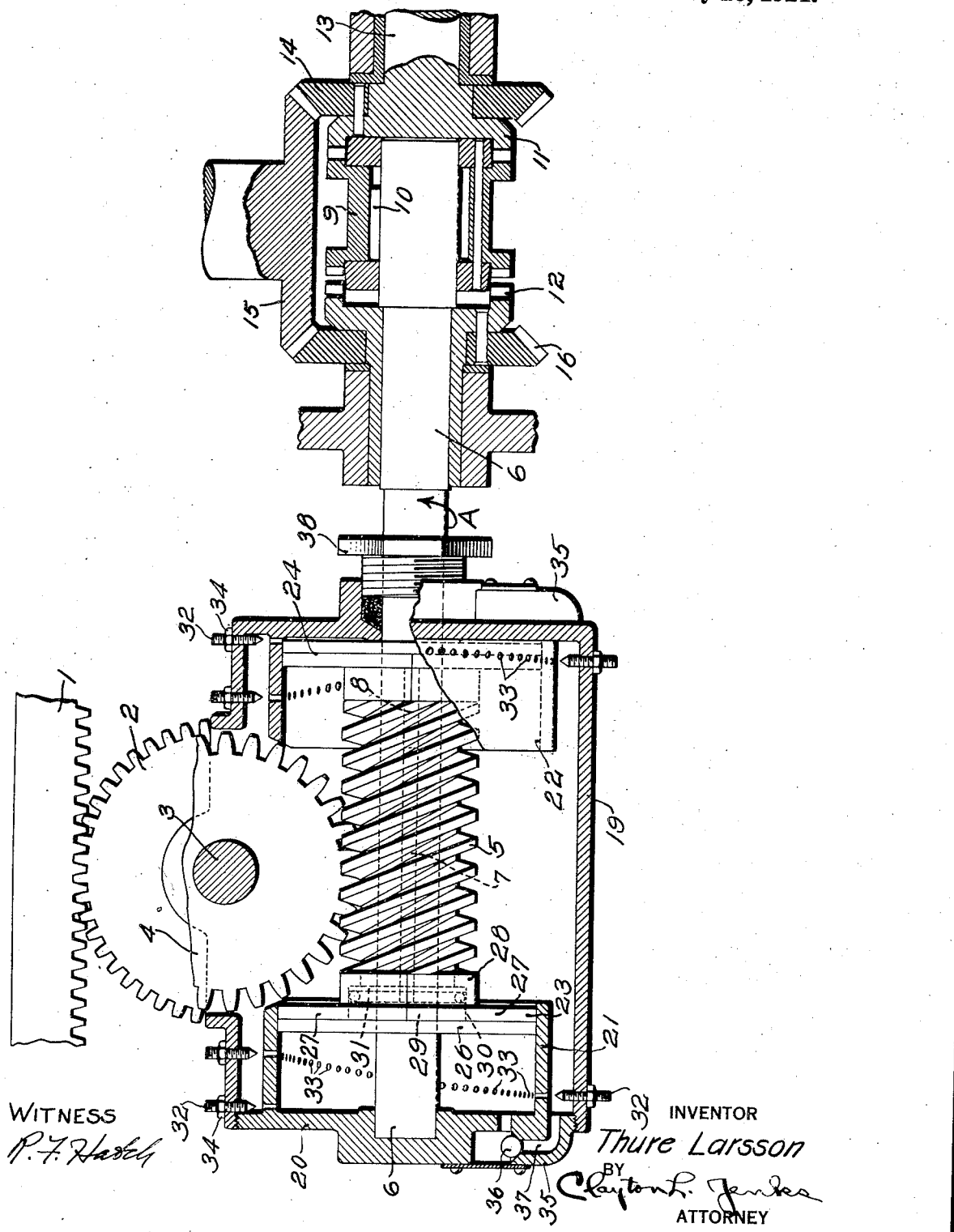

THURE LARSSON, OF WORCESTER, MASSACHUSETTS.

REVERSING MECHANISM.

1,385,966.  Specification of Letters Patent.  Patented July 26, 1921.

Application filed July 29, 1919. Serial No. 314,154.

*To all whom it may concern:*

Be it known that I, THURE LARSSON, a citizen of the United States of America, residing at Worcester, in the county of Worcester and State of Massachusetts, have invented certain new and useful Improvements is Reversing Mechanisms, of which the following is a full, clear, and exact specification.

This invention is an improvement in reversing mechanisms for the purpose of reversing the direction of travel of a moving part, without causing an undesirable jar in the part and without exerting an unusual strain on the driving mechanism.

Certain machine tools, such for example as some types of grinders and planers, are provided with reciprocating tables which carry the work or the tool. The most common drive mechanism for a machine tool table of this character includes a worm which actuates a gear arranged to transmit movement to the table. In order to periodically reverse the direction of travel of the table it is usual to provide a reversible clutch which may be automatically actuated to reverse the direction of rotation of the worm and hence the direction of travel of the table. One means for eliminating the shock of reversing the direction of travel of a worm driven table is to arrange the worm so as to be capable of a longitudinal movement with respect to the gear which it drives. An example of a reversing mechanism of this type may be found in Patent No. 1,150,221, granted on August 17, 1915, on the application of Charles H. Norton.

It will be evident that if the worm is moved longitudinally in the direction of the end thrust thereon while it is rotating, the screw action of the worm will be nullified to an extent determined by the speed of the longitudinal movement of the worm, and that if the worm is moved longitudinally while it is not rotated it will either act as a rack bar on the gear or, if the pitch of the worm is sufficient and rotary movement thereon is not restrained, the worm may screw idly through the worm gear. In any of these constructions, if the worm is moved at the start or stop of the table movement, the movement of the table may be controlled by the longitudinal movement of the worm. A machine tool such as a planer or a grinder which has a heavy reciprocating table has its working speed limited by the speed at which the heavy table can be brought to rest and started again in the opposite direction without injurious shock.

The object of the present invention is to produce a new and improved easy motion reversing mechanism of the type set forth, which will permit the table or moving part of a machine to be reciprocated at a higher speed than has heretofore been practical and without material shock. To the accomplishment of this object, one feature of the invention contemplates the provision of a longitudinally movable worm and means for controlling this movement of the worm by fluid pressure, which pressure is regulated to produce a predetermined stopping or starting movement. For this purpose a cylinder and piston may be provided, one of which is operatively connected with the worm. Means is provided for automatically varying the pressure of the fluid in the cylinder in accordance with the movement desired in the worm. This is most conveniently carried into practical effect by varying the effective area of the port in the cylinder to control the passage of the fluid.

Another object of the invention is to provide an easy motion reversing mechanism in which the acceleration or retardation may be adjusted to correspond to any desired curve. For this purpose the effective area of the port is automatically varied during the movement of the worm in such a manner as to produce the desired variation in speed thereof. The variation in the effective area of the port may be conveniently accomplished by forming the port of a plurality of holes which are arranged to be successively opened or closed in accordance with the direction of travel of the piston.

These and such other features of the invention as may hereinafter appear will be best understood from a description of one embodiment thereof, such for instance as is shown in the accompanying drawing which is a sectional elevation through the reversing mechanism of a grinding machine table.

In the grinding machine selected for the purpose of illustration, power is applied to the grinding machine table, which may carry the work or the wheel, through a rack 1 which is engaged by a gear 2 fixed on a shaft 3. The shaft is driven through a worm gear 4 which is in mesh with a worm 5 mounted on a shaft 6. The worm is free to slide but constrained to rotate with the shaft by a key 7 which engages a spline 8 in the worm.

As is usual in grinding machines of this type, a reversing clutch is provided which, when actuated by the usual mechanism, shifts the direction of rotation of the shaft 6 and therefore reverses the direction of movement of the table. It has been found desirable to incorporate a lost motion in the clutch mechanism, in some instances, by which the shaft is free from control of its driving mechanism for an interval of time when the clutch is shifted. A clutch of this character is fully set forth and described in the co-pending application serial No. 224,330, filed March 23, 1918, by Charles H. Norton, which clutch is well adapted for use with the present invention. As illustrated, the clutch comprises a slidable clutch member 9 which is mounted on an enlarged end of the shaft 6 and connected therewith by a key 10. The lost motion is secured by forming the spline in the member 9 of greater width than the key so that when the direction of rotation of the clutch is reversed, the shaft remains idle until the key 10 engages the other side of the spline. Any suitable mechanism (not shown) may be provided to slide the clutch member 9 into engagement with one or the other of two coöperating clutch members 11 and 12. The member 11 may be formed integral with the end of a continuously driven shaft 13. The member 12 on the shaft 6 is driven in the opposite direction through the train of bevel gears 14, 15 and 16, as will be apparent from the drawing.

The easy stopping and starting movement is obtained by controlling the sliding movement of the worm 5 by the use of a fluid such as air or oil, but it is preferred to use oil on account of its non-elastic quality. The preferred construction for controlling the longitudinal movement of the worm 5 includes the provision of two dashpots, which are arranged not only to retard or dampen the movement of the worm in either direction but also to produce a predetermined variation in the rate of movement of the worm. To this end the main casing 19, which is adapted to form a reservoir for oil, is provided with a cap 20 having the cylinder 21 of one dashpot formed thereon, and the other cylinder 22 is formed on the casing.

Pistons 23 and 24 are mounted one on each end of the worm and arranged to move longitudinally therewith. The pistons do not necessarily rotate with the worm and in order to reduce the friction it is desirable that the ball bearings be provided between the pistons and the worm. One method of connecting the pistons with the worm is illustrated in the drawing, in which an integral disk 26 has secured thereto by screws or rivets (not shown) two semi-circular disks 27, each of which is provided with one-half of a hub 28. The interior of the hub is provided with an annular groove which embraces a flange 29 formed on the worm 5. Ball bearings 30 are provided between the end of the hub 28 and the flange, which takes the end thrust of the worm through a washer 31.

When the worm is turned in either direction it is evident that there will be an end thrust exerted which tends to move one of the pistons toward the outer end of its cylinder. The longitudinal movement of the worm is preferably controlled by regulating the escape of the fluid from within this cylinder or dashpot. The port through which the fluid escapes from the cylinder may be made as one continuous opening, but it has been found more convenient to secure the necessary effective opening of the port by providing a plurality of smaller openings. The effective area of the port is most conveniently varied by arranging the holes in such a manner that as the piston moves toward the bottom of the cylinder the holes are successively closed thereby, so that the pressure in the cylinder may be varied from time to time to produce any desired variation in the rate of movement of the worm. One feature of the invention resides in the arrangement of the port, or the holes which constitute the port, along a line having a predetermined curve, so that as the piston advances the holes are closed at a rate varying with the direction of the curve at each given location. As illustrated, a series of holes 33 may be arranged around the cylinder substantially on the line of a gravity curve. The number and size of the holes depend upon the volume of fluid contained within the piston, the viscosity of the fluid, the desired time of movement and the pressure upon the fluid as determined by the power consumed in moving the table.

One feature of this invention relates to the provision of means for adjusting the speed of the table at successive intervals of time during its movement, which is to change the shape of the graphic curve representing its movement. This may be done by independently varying the size of the holes, which are preferably arranged so that when all of the holes are fully open a certain predetermined curve will be produced but should it be desired to vary the curve, or for certain mechanical reasons if the curve produced failed to correspond exactly with that desired, corrections may be made by adjusting certain of the holes.

The effective orifice of each of the holes may be independently adjusted by means of pointed set screws 32, which, in conjunction with the corresponding holes 33, form needle valves. Each set screw or valve is provided with a locking nut 34 by which it may be fixed in adjusted position. The size of each of the holes 33 being capable, by this means, of independent adjustment, it is apparent that the speed of the sliding movement of the worm may be varied by adjusting each of the holes a like amount so that the time of the movement, which will still vary with the predetermined curve, may be increased or retarded. If it is found that certain mechanical effects prevent the worm from moving with a true gravity movement with equal adjustment of the holes, this may be remedied so as to produce a true gravity movement by adjusting such of the holes 33 as may be necessary. Moreover, if it is desired to cause the worm to move with some other motion than a gravity curve, this may be obtained by the proper adjustment of the several valves.

As the two pistons are arranged to move in unison it is evident that there is a tendency to create a vacuum in the cylinder from which the piston is being withdrawn. In order to overcome this tendency check valves 35 are provided in the ends of the cylinders which permit fluid to freely enter each of the dashpots but which prevent the escape of fluid there-through when it is under pressure. As illustrated in the drawing, a ball 36 is seated in the upper end of the hole 37 in the cylinder casting, which closes the hole against the escape of fluid from the interior of the piston, but, when the piston is creating a suction on the inside of the cylinder, lifts to allow the entrance of fluid. The escape of oil from within the cylinder through the bearing of the shaft 6 in the casing 19 is prevented by a stuffing box 38.

The operation of this invention will be best understood by following the movements of the parts through one cycle of operation. Assume that the casing 19 is filled with oil and that the table rack 1 has just completed its movement to the right; the parts being in the position shown in the drawing. At the end of the stroke the clutch member 9 is shifted by the usual mechanism into its left-hand position which will reverse the direction of rotation of the shaft 6; that is, the shaft is now to be turned with the arrow A, but will not start rotating until the lost motion provided between the key 10 and the clutch member 9 has been taken up, during which time the table will have come to rest. Due to its momentum, the table may continue its movement slightly beyond the position shown and cause the worm gear 4 to turn in a clockwise direction, thus exerting an end thrust toward the left on the worm. The only forces which resist the endwise movement of the worm are friction and the pressure of the fluid within the cylinder 21. Therefore, if the pitch of the worm is not too great the worm may move slightly to the left like a rack until the momentum of the table is overcome. This will be, however, but a small movement in any event, depending on the weight of the table and parts carried thereby. If the pitch of the worm 5 is great enough, the action of the clockwise turning of the worm wheel 4 will tend to rotate the worm. If this rotary movement is desired, it is necessary that the lost motion connection between the clutch member 9 and the shaft be incorporated in the device. When the device is arranged to permit longitudinal movement of the worm on the overrun of the table, it may be desirable to arrange the holes 33 so that none of the holes in the gravity curve will be cut off during this movement, and the pistons will be in a position to give the easiest possible starting action.

Assuming that the worm and shaft have been rotated slightly by the momentum of the table, as soon as the lost motion is taken up by the rotation of the clutch member 9 in its new direction, the worm will be positively rotated with the shaft. The entire end thrust of the load will then be exerted on the worm in such a direction as to move it toward the left. At the first instant the thrust is applied to the worm all of the holes 33 are open, that is, the maximum area of the port is effective and there is but slight resistance to the longitudinal movement of the worm due to the ease with which the oil escapes from the left-hand cylinder. As the piston 23 moves to the left, however, the holes 33 are successively closed or cut off by the advance of the piston at a rate determined by the curve of the line on which the holes are arranged. The arrangement of the holes on a gravity curve is such that during the first unit of travel one part of the entire area of the holes will be cut off; during the second unit of travel three parts of the entire area will be cut off, and so on in the ratio of 1, 3, 5, 7, etc., so that as the piston approaches the end of the dashpot the holes will be closed at an increasing rate and the longitudinal movement of the worm is brought gradually to zero due to the pressure of the entrapped oil. During this movement the inlet valve 35 in the right-hand cylinder is open and oil enters freely through this opening as well as the port holes 33. It will be apparent that the endwise movement of the worm nullifies its screw action, and as the movement of the worm is gradually decreased the screw action increases until the piston is seated against the hub in the bottom of the cylinder, at which time the worm is driving the worm gear and table at its normal and maximum speed. This continues until the direction of travel of the table is again reversed when the cycle of the machine is repeated in the other cylinder 22.

By this construction the starting speed of the grinding machine table or other moving part may be brought up to normal driving speed in any desired time and in any desired ratio of speed increase, in accordance with the line on which the holes 33 are arranged or the adjustment of the valves 32 or both.

While it is preferred to employ the specific construction and arrangement of the parts shown and described, it is to be understood that this construction and arrangement is not essential except so far as may be specified in the claims and that they may be varied or modified without departing from the broader features of the invention.

Having thus described my invention, what I claim as new and desire to secure by Letters Patent is:—

1. A reversing mechanism for reciprocating a load comprising a rotatable, longitudinally movable worm, means to rotate the worm uniformly in opposite directions and fluid controlled means to yieldingly resist longitudinal movement of the worm to start the load gradually and uniformly from rest to a uniform driving rate and thereafter positively limit such longitudinal movement until the mechanism is reversed.

2. An easy motion reversing mechanism having in combination means comprising a worm gear and a longitudinally movable rotatable worm arranged to move the load and liquid operated means comprising a dash pot, provided with a port, the movable member of which is connected with the worm, said means being adapted to yieldingly control the longitudinal movement of the worm and start the load gradually from rest to a normal driving rate.

3. An easy motion reversing mechanism for a reciprocating load having in combination means to move the load comprising a worm gear, a shaft and a rotatable worm slidably keyed on said shaft, and fluid operated means comprising a cylinder having a port of variable effective area adapted to yieldingly retard the longitudinal movement of the worm and thereby gradually accelerate the load from rest to a normal driving rate.

4. An easy motion reversing mechanism having in combination means comprising a worm gear and a longitudinally movable, rotatable worm arranged to move the load and a dashpot operatively connected with said worm and having an exhaust port, the effective area of which is automatically reduced as the worm moves, to yieldingly retard the longitudinal movement of the worm and thereby gradually accelerate the load.

5. An easy motion reversing mechanism having in combination means comprising a longitudinally movable worm arranged to move the load, means for yieldingly resisting the longitudinal movement of the worm and means for adjustably increasing the resistance, whereby the load may be started gradually from rest to a predetermined rate and thereafter moved uniformly at the driving rate.

6. In a machine, the combination of a reciprocating table with means to move the same, said means comprising a longitudinally movable worm, driving means to rotate the worm, means comprising a piston and a cylinder operatively connected with the worm to control the longitudinal movement thereof and accelerate the table without material shock and thereafter permit the table to be driven at a normal rate and means to supply a liquid to said cylinder.

7. In a machine the combination of a reciprocating table with means to move the same, comprising a longitudinally movable worm, driving means to rotate the worm and fluid operating means comprising a cylinder operatively connected with the worm, said cylinder having a port the effective area of which is varied during movement of the worm, whereby the longitudinal movement of the worm may be controlled to start the table without material shock and thereafter permit the table to be driven at a normal rate and means to supply a liquid to the cylinder.

8. An easy motion reversing mechanism having in combination a longitudinally movable worm arranged to move the load, a piston and cylinder having connections between the movable member and the worm, and a series of holes in the cylinder arranged to be closed at varying rates by the relative movement of the piston and the cylinder.

9. In an easy motion reversing mechanism having a longitudinally movable driving worm, the combination of a piston and cylinder having one member movable with the worm, a series of holes in the cylinder arranged to be closed successively by the relative movement between the piston and the cylinder and means for independently adjusting the effective area of each hole.

10. An easy motion reversing mechanism having in combination a longitudinally movable worm arranged to move the load, a dashpot connected with the worm and arranged to yieldingly retard the movement of the worm to start the load gradually from rest to full speed in accordance with a predetermined curve and means to permit the worm to be turned by the momentum of the load.

11. An easy motion reversing mechanism having in combination a longitudinally movable worm arranged to move the load, means comprising a dashpot connected with the worm and arranged to yieldingly and adjustably retard the longitudinal movement thereof, means for driving the worm alternately in opposite directions and means for disconnecting the worm from the driving mechanism when the direction of rotation is about to be reversed.

12. An easy motion reversing mechanism having in combination a worm gear arranged to move the load, a shaft, means to rotate the shaft alternately in opposite directions, a driving worm for the worm gear slidably keyed on the shaft, two pistons carried by the worm and coöperating cylinders for the pistons, each having an exhaust port and a fluid inlet opening, whereby the worm may be permitted to move longitudinally and the load be gradually accelerated from rest to full speed.

13. An easy motion reversing mechanism having in combination a worm gear arranged to move the load, a shaft, means to rotate the shaft alternately in opposite directions, a worm connected with the worm gear slidably mounted on the shaft but rotatable therewith, two pistons rotatably mounted on the worm, coöperating cylinders for the pistons each having a plurality of exhaust holes arranged to be successively cut off by the travel of the pistons and valves to independently adjust the effective area of the holes.

Signed at Worcester, Massachusetts, this 28th day of July 1919.

THURE LARSSON.